United States Patent Office 3,567,836
Patented Mar. 2, 1971

3,567,836
FLUORINE CONTAINING ETHYL DISULFIDE FUNGICIDES
Don R. Baker and Harry A. Pacini, Pinole, and Thomas B. Williamson, Santa Clara, Calif., assignors to Stauffer Chemical Company, New York, N.Y.
No Drawing. Division of application Ser. No. 606,545, Jan. 3, 1967, now Patent No. 3,474,146, dated Oct. 21, 1969. Continuation-in-part of application Ser. No. 520,091, Jan. 12, 1966, which is a continuation of application Ser. No. 351,533, Mar. 12, 1964. This application June 4, 1969, Ser. No. 841,178
Int. Cl. A01n 9/12
U.S. Cl. 424—336        11 Claims

ABSTRACT OF THE DISCLOSURE

Fluorine-containing ethyl organic disulfides of the formula

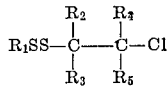

wherein $R_1$ can be an alkyl having from 1 to 8 carbon atoms, cyclohexyl, lower alkenyl, phenyl, halophenyl, lower alkyl phenyl wherein said lower alkyl portion contains 1 to 4 carbon atoms, phenalkyl, wherein said alkyl portion contains 1 to 4 carbon atoms, and naphthyl; $R_2$, $R_3$, $R_4$ and $R_5$ can be hydrogen, fluorine, and chlorine, at least two of said $R_2$, $R_3$, $R_4$ and $R_5$ are fluorine or chlorine of which at least one is a fluorine atom; for example, 2,2-difluoro-2-chloroethyl n-butyl disulfide, 1,1-difluoro-2-chloroethyl n-butyl disulfide, 2,2-difluoro-1,1,2-trichloroethyl benzyl disulfide, and 1-fluoro-1,2,2,2-tetrachloroethyl phenethyl disulfide. Extremely effective for controlling and inhibiting the growth of fungi such as *Aspergillus niger* and *Penicillium sp.*, and controlling the acarid, two-spotted mite, *Tetranychus telarius* (Linn.).

---

This application is a division of copending application Ser. No. 606,545, filed Jan. 3, 1967, now U.S. Pat. No. 3,474,146, and is a continuation-in-part of application, Ser. No. 520,091, filed Jan. 12, 1966, which is a continuation of application, Ser. No. 351,533, filed Mar. 12, 1964, both now abandoned.

This invention relates to new and useful sulfur-containing compounds, and more particularly, to improved fungicides and acaricides. More specifically, this invention relates to the preparation and use of new chemical compounds, halogenated ethyl organic disulfides of the formula

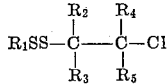

wherein $R_1$ is a member selected from the group consisting of alkyl containing from 1 to 8 carbon atoms, cyclohexyl, lower alkenyl, phenyl, halophenyl, lower alkyl phenyl wherein said lower alkyl portion contains 1 to 4 carbon atoms, phenalkyl, wherein said alkyl portion contains 1 to 4 carbon atoms, and naphthyl; $R_2$, $R_3$, $R_4$ and $R_5$ are selected from the group consisting of hydrogen, fluorine, and chlorine, at least two of said $R_2$, $R_3$, $R_4$ and $R_5$ are fluorine or chlorine of which at least one is a fluorine atom. Substituted derivatives of R can also be used in the compositions of this invention. Whereas, it is the novel nature and placement of the halogen in the halogenated ethyl radical which is believed to impart to the compounds their superior physiological activity. Thus, additional substituents on the R radical may be alkyl, aryl, halogen and the like.

Examples of alkyl groups containing from 1 to 8 carbon atoms are methyl, ethyl, normal propyl, isopropyl, normal butyl, secondary butyl, isobutyl, tertiary butyl, amyl, hexyl, heptyl, and octyl. Examples of lower alkyl portions that can be substituted on a alkylphenyl and which contain 1 to 4 carbon atoms are methyl, ethyl, normal propyl, isopropyl, normal butyl, secondary butyl, isobutyl, and tertiary butyl. Further examples of phenalkyl substituents wherein said alkyl portion contains 1 to 4 carbon atoms are benzyl, phenyl ethano, phenyl propano, phenyl butano. It will be observed that all of these compounds have at least one fluorine atom in the haloethyl group adjacent to the sulfur atom. In contrast, the compounds of Aichenegg et al. Patent 3,141,045, are saturated disulfides which have haloethyl groups wherein the halo atoms are chlorine or bromine.

It has been found that fluorine-containing halogenated ethyl organics disulfides are extremely effective for controlling and inhibiting the growth of fungi and acarids. It is the presence of the halogenated ethyl ralical which provides new and valuable characteristics for the compounds of the present invention. These compounds may therefore be used as novel ingredients in physiologically active compositions.

The sulfenyl chlorides used in the preparation of the disulfides of the instant invention are inherently a mixture of isomers. For example, the isomeric mixture represented by $-C_2H_2ClF_2$ when derived from the starting materials $CF_2=CH_2$ and $SCl_2$ is $CF_2ClCH_2-$ and $CH_2ClCF_2-$; for $-C_2Cl_3F_2$ when derived from

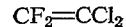

and $SCl_2$ is $CF_2ClCCl_2-$ and $CCl_3CF_2-$; and $-C_2Cl_4F$ when derived from $CCl_2=CClF$ and $SCl_2$ is $CCl_3CFCl-$ and $CFCl_2CCl_2-$.

The compounds of this invention which can be used in active preparations may be prepared in general by the condensation reaction of a fluorine-containing halogenated ethane sulfenyl chloride with the appropriate mercaptan. The reaction is carried out in an inert solvent or preferably in no solvent. Approximately stoichiometric quantities of fluorine-containing halogenated ethyl sulfenyl chloride was added to the appropriate mercaptan. The reaction appears to be very fast when carried out at about room temperature. In most cases the reaction was allowed to proceed for ½ to 2 hours. If the reaction becomes very vigorous with the evolution of heat, cooling may be necessary. The product is recovered by removal of the by-product hydrogen halide and the inert solvent in vacuo.

The compounds of the present invention may be made in accordance with the following non-limiting example.

EXAMPLE

Difluoromonochloroethyl n-butyl disulfide was prepared by the addition of 5.5 ml. (0.050 mole) of difluoromonochlroethane sulfenyl chloride to 6.4 ml. of n-butyl mercaptan. The addition was accomplished over a period of about 5 minutes at room temperature. Hydrogen chloride gas was given off during and just after the addition. The reaction mixture was allowed to stand for ½ hour and any remaining volatile material removed in vacuo. There was obtained 10.5 g. (96% yield) of the product, a light yellow oil, $n_D^{30} = 1.4792$.

Note: The sulfenyl chloride used was by the nature of its preparation a mixture of 2,2-difluoro-2-chloroethane-sulfenyl chloride, $CF_2ClCH_2SCl$ (45%), and 1,1-difluoro-2-chloroethanesulfenyl chloride, $CH_2ClCF_2SCl$ (55%), B.P. 40–43° C./50 mm., $n_D^{30} = 1.4500$. The percentages of the sulfenyl chlorides were determined by nuclear magnetic resonance investigation.

The following is a list of the compounds prepared following the aforedescribed procedures. Compound numbers have been assigned to each compound and are used throughout the balance of the application.

In vitro fungicide evaluation test.—The compounds

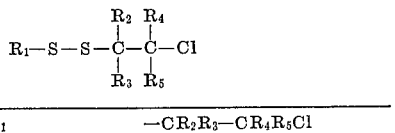

| Compound number | $R_1$ | $-CR_2R_3-CR_4R_5Cl$ |
|---|---|---|
| 1* | n-Butyl | $-CH_2CF_2Cl, -CF_2CH_2Cl$ |
| 2 | Phenyl | $-CH_2CF_2Cl, -CF_2CH_2Cl$ |
| 3 | Benzyl | $-CH_2CF_2Cl, -CF_2CH_2Cl$ |
| 4 | 4-chlorophenyl | $-CH_2CF_2Cl, -CF_2CH_2Cl$ |
| 5 | Allyl | $-CH_2CF_2Cl, -CF_2CH_2Cl$ |
| 6 | Ethyl | $-CH_2CF_2Cl, -CF_2CH_2Cl$ |
| 7 | Propyl | $-CH_2CF_2Cl, -CF_2CH_2Cl$ |
| 8 | Isopropyl | $-CH_2CF_2Cl, -CF_2CH_2Cl$ |
| 9 | Octyl | $-CH_2CF_2Cl, -CF_2CH_2Cl$ |
| 10 | Benzyl | $-CCl_2CClF_2, -CF_2CCl_3$ |
| 11 | Ethyl | $-CCl_2CClF_2, -CF_2CCl_3$ |
| 12 | Phenethyl | $CFClCCl_3, CCl_2CCl_2F$ |
| 13 | p-Tolyl | $CFClCCl_3, CCl_2CCl_2F$ |
| 14 | Cyclohexyl | $CFClCCl_3, CCl_2CCl_2F$ |
| 15 | Methyl | $CFClCCl_3, CCl_2CCl_2F$ |
| 16 | Isobutyl | $CFClCCl_3, CCl_2CCl_2F$ |
| 17 | n-Hexyl | $CFClCCl_3, CCl_2CCl_2F$ |
| 18 | Isopentyl | $CFClCCl_3, CCl_2CCl_2F$ |
| 19 | n-Propyl | $CFClCCl_3, CCl_2CCl_2F$ |
| 20 | Ethyl | $CFClCCl_3, CCl_2CCl_2F$ |
| 21 | 4-chlorophenyl | $CFClCCl_3, CCl_2CCl_2F$ |
| 22 | Allyl | $CFClCCl_3, CCl_2CCl_2F$ |
| 23 | β-Naphthyl | $CFClCCl_3, CCl_2CCl_2F$ |

* No. 1 prepared in the example.

As previously mentioned, the herein described compositions produced in the above described manner are physiologically active compounds which are useful and valuable in controlling various organisms. The compounds of this invention were tested as fungicides in the following manner.

In vitro fungicide evaluation test.—The compounds were tested against growing fungi in an artificial medium. Fungi are tested in vitro starting with two 1-ounce vials partially filled with malt broth. The compound to be tested was placed in the vials at the desired concentration (expressed in parts per million) and mixed with the broth. The vials were inoculated with a water suspension of spores of the desired fungi. The fungi used for this test were *Aspergillus niger* and *Penicillium sp.* The bottles were then sealed and held for one week, after which time the results were observed and noted. The data obtained in this manner is presented in the table under in Vitro Vial Test—*Aspergillus niger* and *Penicillium sp.*

Soil fungicide incorporation test.—In this test the activity of a compound is determined against soil-borne pathogenic fungi. *Fusrium solani* was the fungus used in this test. Spores of the fungus were added to a larger portion of soil and then 1-pound portions were placed in quart jars. The chemical to be tested was pipetted into the fungus infested soil at a predetermined rate, mixed thoroughly, and then placed in a paper container. Beans were planted into the *Fusarium solani*-infested and treated soil. Three to four weeks later the plants were inspected for disease symptoms. The lowest concentrations which prevented development of disease symptoms are reported. The results obtained with compounds of this invention are given in the table under Soil Fungicide Test—*Fusarium solani.*

TABLE I

[Concentration (p.p.m.) which allowed no growth of fungi]

| | In vitro vial test | | Soil fungicide test, |
|---|---|---|---|
| | *Aspergillus niger* | *Penicillium sp.* | *Fusarium solani* |
| Compound number: | | | |
| 1 | ¹5 | ¹5 | ¹2.5 |
| 2 | ¹5 | ¹5 | ¹2.5 |
| 3 | ¹5 | ¹5 | ¹2.5 |
| 4 | ¹5 | ¹5 | 55 |
| 5 | ¹5 | ¹5 | ¹2.5 |
| 6 | ¹5 | ¹5 | ¹2.5 |
| 7 | ¹5 | ¹5 | ¹2.5 |
| 8 | ¹5 | ¹5 | ²5 |
| 9 | ²5 | ²5 | 110 |
| 10 | 50 | ¹5 | 12 |
| 11 | 25 | ²10 | ²5 |
| 12 | ¹5 | ¹5 | >110 |
| 13 | 10 | ¹5 | 13 |
| 14 | ¹5 | ¹5 | >110 |
| 15 | 10 | 10 | 2.5 |
| 16 | ¹5 | ¹5 | 13 |
| 17 | ¹5 | ²5 | 27 |
| 18 | ¹5 | ¹5 | ²13 |
| 19 | ¹5 | ¹5 | ²2.5 |
| 20 | ¹5 | ¹5 | ¹2.5 |
| 21 | 10 | ²5 | >110 |
| 22 | ²5 | ²5 | ²2.5 |
| 23 | 25 | 50 | 110 |

¹ Lowest rate tested.
² Partial control.

The compounds of the present invention were also found to be particularly effective in the control of the two-spotted mite, *Tetranychus telarius* (Linn.).

The particularly preferred compounds of the present invention are the substituted difluoromonochloroethyl disulfides in which the R is a member as defined, supra. These compounds are readily available from the reaction of the appropriate mercaptan and difluoromonochoroethyl sulfenyl chloride. These compounds are effective in the control of fungi and acarids.

The organic disulfides described in the present invention may be applied in their use as fungicides and acaricides in a variety of ways at various concentrations. They may be combined with suitable carriers and applied as dusts, sprays, or drenches. The amount applied will depend upon the nature of the utility. The rate of application may also vary with the biological use intended.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. The method of inhibiting the growth of fungi on plants and soil comprising applying to said fungi an effective fungicidal amount of a compound having the formula

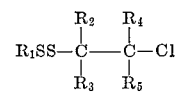

wherein $R_1$ is a member selected from the group consisting of alkyl containing from 1 to 8 carbon atoms, cyclohexyl, lower alkenyl, phenyl, halophenyl, lower alkyl phenyl wherein said lower alkyl portion contains 1 to 4 carbon atoms, phenalkyl, wherein said alkyl portion contains 1 to 4 carbon atoms, and naphthyl; $R_2$, $R_3$, and $R_4$ and $R_5$ are selected from the group consisting of hydrogen, fluorine, and chlorine, at least two of said $R_2$, $R_3$, $R_4$ and $R_5$ are fluorine or chlorine of which at least one is a fluorine atom.

2. The method of inhibiting the growth of fungi according to claim 1 wherein $R_1$ is n-butyl, $R_2$ and $R_3$ are hydrogens and $R_4$ and $R_5$ are fluorines.

3. The method of inhibiting the growth of fungi according to claim 1 is n-butyl, $R_2$ and $R_3$ are fluorines, and $R_4$ and $R_5$ are hydrogens.

4. The method of inhibiting the growth of fungi according to claim 1 wherein $R_1$ is benzyl, $R_2$ and $R_3$ are hydrogens, and $R_4$ and $R_5$ are fluorines.

5. The method of inhibiting the growth of fungi according to claim 1 wherein $R_1$ is benzyl, $R_2$ and $R_3$ are fluorines, and $R_4$ and $R_5$ are hydrogens.

6. The method of inhibiting the growth of fungi according to claim 1 wherein $R_1$ is allyl, $R_2$ and $R_3$ are hydrogens, and $R_4$ and $R_5$ are fluorines.

7. The method of inhibiting the growth of fungi according to claim 1 wherein $R_1$ is allyl, $R_2$ and $R_3$ are fluorines, and $R_4$ and $R_5$ are hydrogens.

8. The method of inhibiting the growth of fungi according to claim 1 wherein $R_1$ is ethyl, $R_2$ and $R_3$ are chlorines, and $R_4$ and $R_5$ are fluorines.

9. The method of inhibiting the growth of fungi according to claim 1 wherein $R_1$ is ethyl, $R_2$ and $R_3$ are fluorines, and $R_4$ and $R_5$ are chlorines.

10. The method of inhibiting the growth of fungi according to claim 1 wherein $R_1$ is ethyl, $R_2$ is fluorine, and $R_3$, $R_4$, and $R_5$ are chlorines.

11. The method of inhibiting the growth of fungi according to claim 1 wherein $R_1$ is ethyl, $R_2$, $R_3$, and $R_4$ are chlorines, and $R_5$ is fluorine.

References Cited
UNITED STATES PATENTS

| | | | |
|---|---|---|---|
| 3,006,964 | 10/1961 | Oester Ling | 260—608 |
| 3,141,045 | 7/1964 | Aichenegg | 424—336 |

JEROME D. GOLDBERG, Primary Examiner

PO-1050
(5/69)

UNITED STATES PATENT OFFICE
CERTIFICATE OF CORRECTION

Patent No. 3,567,836     Dated March 2, 1971

Inventor(s) Don R. Baker, et al.

It is certified that error appears in the above-identified patent and that said Letters Patent are hereby corrected as shown below:

Column 1, line 49, the word "anl" should read ---and---.

Column 2, line 40, the portion of the line reading "and -$C_2Cl_4F$", should read ---and for -$C_2Cl_4F$ ---

Column 2, line 25, the word reading "organics", should read ---organic---.

Column 3, line 17, which reads "In vitro fungic evaluation test. - The compounds", should be deleted in t Column 3, in the table, for Compound No. 5, und the heading $R_1$ which reads "Ally.", should read ---Allyl- Column 3, line 63, the word reading "Fusrium", should read ---Fusarium---.

Column 4, line 74, in Claim 3, the portion of the line reading "Claim 1 is n-butyl,", should read ---Claim 1 wherein $R_1$ is n-butyl,---.

Signed and sealed this 30th day of May 1972.

(SEAL)
Attest:

EDWARD M. FLETCHER, JR.
Attesting Officer

ROBERT GOTTSCHALK
Commissioner of Patents